United States Patent [19]
Watson

[11] 3,807,256
[45] Apr. 30, 1974

[54] TORQUE SENSING ROTARY MECHANICAL TRANSLATING DEVICE

[76] Inventor: Thomas A. W. K. Watson, 2720 Goyer, Apt. 24, Montreal, Quebec, Canada

[22] Filed: Sept. 5, 1972

[21] Appl. No.: 286,592

[52] U.S. Cl. ............................................. 74/675
[51] Int. Cl. ......................................... F16h 37/06
[58] Field of Search ...................................... 74/675

[56] References Cited
UNITED STATES PATENTS

| | | | |
|---|---|---|---|
| 2,263,371 | 11/1941 | Tolnai | 74/675 X |
| 1,964,188 | 6/1934 | Von Kerabetz | 74/675 |
| 2,460,863 | 2/1949 | Weiss | 74/675 |
| 2,771,791 | 11/1956 | Bachman | 74/675 |
| 2,969,696 | 1/1961 | Fraga | 74/675 X |
| 3,537,334 | 11/1970 | Gilbert | 74/675 |

*Primary Examiner*—A. T. McKeon

[57] ABSTRACT

The invention describes a rotary mechanical translating device having a power input shaft, a power output shaft and a control input shaft which exhibits power amplification between its control input shaft and its power output shaft. The device acts to transfer power from a prime mover connected to its power input shaft, to its power output shaft under control of the rotational speed of its control input shaft. It is a mechanical amplifier employing a torque sensing means which controls a variable speed transmission.

2 Claims, 2 Drawing Figures

PATENTED APR 30 1974

3,807,256

TORQUE SENSING ROTARY MECHANICAL TRANSLATING DEVICE

The invention relates to rotary mechanical translating device's exhibiting mechanical amplification. It more specifically relates to rotary mechanical translating device's which employ a torque sensing means to control a variable speed transmission.

Rotary mechanical translating devices are described in my U.S. Pat. application: "Rotary Mechanical Translating Devices," U.S. Pat. Ser. No. 94,819; "Rotary Mechanical Translating Devices employing Rotary Releasers," U.S. Pat. Ser. No. 158,250, now U.S. Pat. No. 3,765,269; "A System for Rotary Mechanical Translating Devices," U.S. Pat. Ser. No. 195,663, now U.S. Pat. No. T911,014.

A torque sensing means having an input shaft, an output shaft and a member that is displaced as a function of torque; is used in conjunction with a variable speed transmission having a speed control means driven by a prime mover to construct a rotary mechanical translating device which exhibits rotary mechanical amplification. The torque sensing means member that is displaced as a function of torque is connected to the control means of the transmission. The output shaft of the transmission and the torque sensing device are connected together. When the input shaft of the torque sensing device is rotated, the member that is displaced as a function of torque advances the speed control means of the transmission causing the output shaft of the transmission to rotate, being driven by the prime mover. The device acts to transfer power from the prime mover to the output of the transmission under control of the rotation of the input shaft of the torque sensing means.

The objective is to provide a completely mechanical means of mechanical amplification employing a torque sensing means connected to a variable speed transmission.

Figure 1:
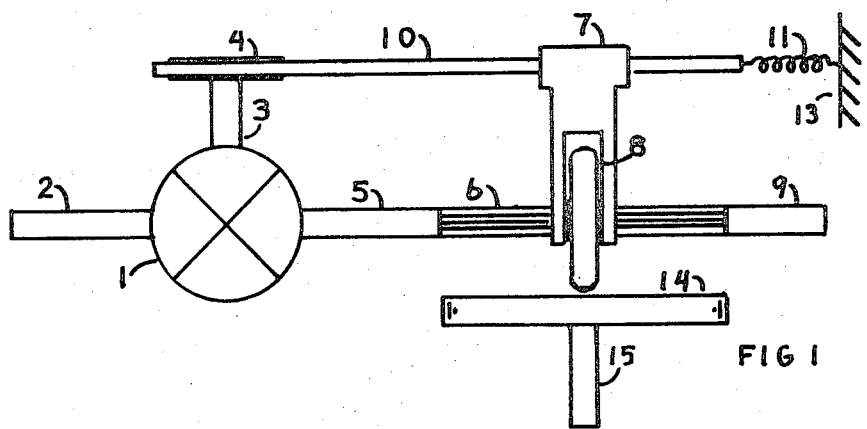
FIG. 1 shows a side view of a torque sensing rotary mechanical translating device.
Figure 2:
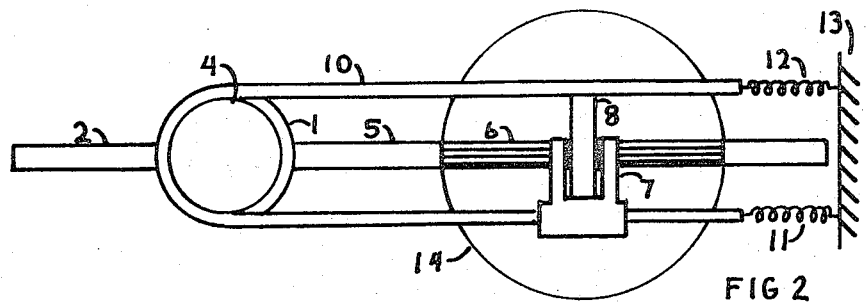
FIG. 2 shows a plan view of FIG. 1.

Shafts 2, 3 and 5 are connected to differential 1. A sprocket 4 is connected to shaft 3. A chain 10 partially encompasses sprocket 4. Springs 11 and 12 are each connected to frame 13 and to chain 10. The chain 10 acts as a member that is displaced as a function of torque. These components form a torque sensing means. A fork 7 is connected to chain 10. Fork 7 acts as a speed control means. Wheel 8 slides on splined shaft 6 and bears against disc 14. Wheel 8 is rotatably connected to fork 7. Shafts 5 and 9 are connected to shaft 6. Shaft 15 is connected to disc 14.

Operationally a prime mover is connected to the power input shaft 15, and a load to the power output shaft 9. Shaft 2 acts as the control input shaft. Wheel 8 is centered on disc 14. When shaft 15 is rotated by the prime mover, wheel 8 will remain stationary until it is moved off the center of disc 14, by fork 7. When the control shaft 2 is rotated, shaft 3 will slightly rotate. Shaft 5 instantaneously will remain stationary. Rotation of shaft 3 will cause movement of sprocket 4, hence chain 10. This displaces fork 7 which in turn moves wheel 8 off the center of disc 14. This causes wheel 8 to rotate being driven by disc 14. It also rotates shaft 5. Since shafts 2 and 5 are interconnected through the differential 1, and shaft 3 can only move through a small angle due to the limitations imposed upon it by springs 11 and 12, shafts 2 and 5 rotate in unison. If shaft 2 is made to rotate momentarily faster than shaft 5, shaft 3 will move resulting in the further deflection of fork 7, hence speeding up wheel 8. This will result in shaft 5 catching up with shaft 2. If shaft 2 is rotated slower than shaft 5, fork 7 will be returned toward its central position by springs 11 or 12, which will result in slowing down shaft 5. If the speed of rotation of shaft 2 is dropped to zero then fork 7 will return wheel 8 to the center of disc 14, hence reducing wheel 8's speed to zero. If shaft 2 were rotated in the opposite direction it would deflect fork 7 in the opposite direction, hence causing wheel 8 to rotate in the opposite direction.

This device exhibits mechanical amplification between its control shaft 2 and its output shaft 9. Very little power is required to drive shaft 2 since it is only required to provide the power necessary to displace fork 7 and wheel 8, compared to the power transferred to shaft 9 through the transmission from an external prime mover connected to shaft 15. Since the prime mover connected to shaft 15 supplies considerably more torque to shaft 9 than is required to rotate shaft 2, and shafts 2 and 9 rotate at the same speed the device as shown exhibits torque amplification. It also exhibits power amplification since the speed of shaft 2 and 9 is the same. If a step up gear were connected to shaft 9 its output could exhibit speed, torque and power amplification simultaneously.

Shaft 5 may be disconnected from shaft 6 and connected to a prony brake. The rotation of shaft 2 would again deflect fork 7 hence causing the rotation of shaft 9. When shaft 2 is not rotated fork 7 will center wheel 8 on disc 14 resulting in no rotation of shaft 9. Since shaft 9 does not precisely follow shaft 2, this form of the device is non linear.

The term connection will be used to designate the connections to the shafts within the Rotary Mechanical Translating Device.

I claim:

1. A rotary mechanical translating device comprising a torque sensing means having an input connection and a member that is displaced as a function of torque; a variable speed transmission having an input connection, an output connection and a speed control means; in which the member that is displaced as a function of torque is connected to the speed control means.

2. A rotary mechanical translating device comprising a torque sensing means having an input connection, an output connection and a member that is displaced as a function of torque; a variable speed transmission having an input connection, an output connection and a speed control means; in which the output connection of the torque sensing means is connected to the output connection of the variable speed transmission and the member that is displaced as a function of torque is connected to the speed control means.

* * * * *